United States Patent
Mitsuishi et al.

(10) Patent No.: US 7,318,959 B2
(45) Date of Patent: *Jan. 15, 2008

(54) OPTICAL ELEMENT HAVING ANTIREFLECTION FILM

(75) Inventors: Takeshi Mitsuishi, Tokyo (JP); Takeshi Imizu, Tokyo (JP); Hiroshi Kojima, Tokyo (JP); Hitoshi Kamura, Tokyo (JP); Ken-ichi Shinde, Tokyo (JP)

(73) Assignee: Hoya Corporation, Tokyo (JP)

( * ) Notice: Subject to any disclaimer, the term of this patent is extended or adjusted under 35 U.S.C. 154(b) by 210 days.

This patent is subject to a terminal disclaimer.

(21) Appl. No.: 10/745,445

(22) Filed: Dec. 24, 2003

(65) Prior Publication Data

US 2004/0146723 A1 Jul. 29, 2004

(30) Foreign Application Priority Data

Dec. 26, 2002 (JP) .............................. 2002-378192

(51) Int. Cl.
*B32B 25/20* (2006.01)
(52) U.S. Cl. ...................................... 428/446; 428/447
(58) Field of Classification Search ................ 428/446, 428/447
See application file for complete search history.

(56) References Cited

U.S. PATENT DOCUMENTS

| | | | | |
|---|---|---|---|---|
| 6,919,134 B2 * | 7/2005 | Mitsuishi et al. | ............ | 428/447 |
| 6,958,172 B2 * | 10/2005 | Shirakawa et al. | ......... | 427/166 |
| 2002/0008018 A1 | 1/2002 | Murayama et al. | | |
| 2002/0048087 A1 | 4/2002 | Mitsuishi et al. | | |
| 2002/0060848 A1 | 5/2002 | Mitsuishi et al. | | |
| 2003/0129422 A1 | 7/2003 | Shirakawa et al. | | |
| 2003/0193719 A1 | 10/2003 | Mitsuishi et al. | | |
| 2003/0198818 A1 | 10/2003 | Mitsuishi et al. | | |

FOREIGN PATENT DOCUMENTS

| | | |
|---|---|---|
| EP | 0964019 A1 | 12/1999 |
| EP | 1 123 905 A2 | 8/2001 |
| EP | 1 168 004 A2 | 1/2002 |
| EP | 1 184 686 A2 | 3/2002 |
| EP | 1 306 695 A2 | 5/2003 |
| EP | 1 324 078 A2 | 7/2003 |
| JP | 63-141001 | 6/1988 |
| JP | 11-311702 * | 11/1999 |

OTHER PUBLICATIONS

International Search Report dated Apr. 13, 2004.
Candain Intellectual Property Office Communication (Aug. 2, 2007).

* cited by examiner

*Primary Examiner*—Kuo-Liang Peng
(74) *Attorney, Agent, or Firm*—Finnegan, Henderson, Farabow, Garrett & Dunner, LLP (57) ABSTRACT

The present invention provides an optical member having a plastic substrate and a multilayered antireflection film formed by vapor deposition, wherein at least one layer in the antireflection film is a hybrid layer formed of at least one inorganic substance selected from silicon dioxide, aluminum oxide, titanium oxide, zirconium oxide, tantalum oxide, yttrium oxide, and niobium oxide and an organosilicon compound that is a liquid at normal temperature and at atmospheric pressure and/or an organic compound not containing silicon that is a liquid at normal temperature and at atmospheric pressure as vapor deposition raw materials.

12 Claims, 1 Drawing Sheet

FIG. 1

OPTICAL ELEMENT HAVING ANTIREFLECTION FILM

DESCRIPTION OF THE INVENTION

The present application claims priority under 35 U.S.C. § 119 of Japanese Application No. 2002-378192, filed Dec. 26, 2002, the disclosure of which is expressly incorporated by reference herein in its entirety.

FIELD OF THE INVENTION

The present invention relates to an optical member having an antireflection film, and particularly to an optical member having an antireflection film with good productivity, which not only has an antireflection film having excellent properties such as low reflectance and high transmittance but also has excellent impact resistance, adhesiveness, heat resistance, abrasion resistance and alkali resistance on the plastic substrate.

BACKGROUND OF THE INVENTION

Hitherto, optical members in which an antireflection film having an inorganic substance vapor deposited thereon is provided on a plastic substrate are known. Such optical members have excellent antireflection properties and resistance to scuffing.

However, these optical members having an antireflection film are not sufficient in impact resistance and heat resistance. It is known to provide a primer layer made of an organic substrate between a plastic substrate and an antireflection film. Also, in plastic lenses, the refractive index of a lens material becomes high, and plastic lens materials having an antireflection film and having a refractive index of 1.70 or more, which are provided with a primer layer by dipping and vapor deposited with an inorganic substance, are proposed in the market (see EP 0964019 A1 (Patent Document 1)).

However, since the primer layer disclosed in Patent Document 1 and the like is provided by coating a primer liquid on a plastic substrate, heating the primer solution for curing, and then vapor depositing an antireflection film thereon, there was some possibility that the film thickness of the primer layer does not become uniform. Also, with respect to the primer layer disclosed in Patent Document 1, since the primer layer is provided in atmosphere, whereas the antireflection film is provided in vacuo, there were involved problems such that foreign matters were liable to enter between the antireflection film and the primer layer and that it took a long period of time to prepare final products.

Also, the optical member comprising a plastic lens material having a refractive index of 1.70 or more as a substrate and having the foregoing primer layer and the antireflection film made of an inorganic vapor deposited substance provided thereon on a basis of this substrate had a problem in resistance to scuffing on the surface.

SUMMARY OF THE INVENTION

The invention provides an optical member having an antireflection film with good productivity, which not only has an antireflection film having excellent properties such as low reflectance and high transmittance but also has excellent impact resistance, adhesiveness, heat resistance, abrasion resistance and alkali resistance on the plastic substrate.

It has been found that by providing a hybrid layer comprising an inorganic substance and an organic substance in at least one layer of constitutional layers of an antireflection film, an optical member having an antireflection film, which has excellent abrasion resistance, impact resistance, adhesiveness, heat resistance and alkali resistance, is obtained.

The present invention relates to an optical member having a plastic substrate and a multilayered antireflection film formed by vapor deposition, characterized in that at least one layer in the antireflection film is a hybrid layer formed of at least one inorganic substance selected from silicon dioxide, aluminum oxide, titanium oxide, zirconium oxide, tantalum oxide, yttrium oxide, and niobium oxide and an organosilicon compound that is a liquid at normal temperature and at atmospheric pressure and/or an organic compound not containing silicon that is a liquid at normal temperature and at atmospheric pressure as vapor deposition raw materials. By normal temperature, we mean room temperature of about 25° C.

BRIEF DESCRIPTION OF THE DRAWINGS

FIG. 1 is a schematic view of a film forming device used in the invention. The reference numbers in FIG. 1 have the following meanings 1: Optical type film thickness monitor
2: Substrate
3: Dome for holding substrate
4: Inlet A of organic substance
5: Inlet B of organic substance
6: Evaporation source
7: RF type ion gun
8: Inlet of ionized gas
9: Connection portion to exhaust system
10: Connection portion to external monomer heating (vaporizing) device

DETAILED DESCRIPTION OF THE INVENTION

The particulars shown herein are by way of example and for purposes of illustrative discussion of the various embodiments of the present invention only. In this regard, no attempt is made to show details of the invention in more detail than is necessary for a fundamental understanding of the invention, the description making apparent to those skilled in the art how the several forms of the invention may be embodied in practice.

The antireflection film of the invention is formed by vapor deposition. Also, for the sake of obtaining good film strength and adhesiveness, it is preferable that the antireflection film is formed by ion beam assisted deposition. Other film constitutional layers of the antireflection film than the hybrid layer are not particularly limited. However, in order to obtain good physical properties such as an antireflection effect, it is preferable to have an $SiO_2$ layer or a mixed layer of $SiO_2$ and $Al_2O_3$ as a low refractive index layer and an $Nb_2O_5$ layer or a $TiO_2$ layer as a high refractive index layer, respectively.

In the invention, the inorganic substance that is used in the hybrid layer is at least one member selected from silicon dioxide, aluminum oxide, titanium oxide, zirconium oxide, tantalum oxide, yttrium oxide, and niobium oxide. These inorganic substances may be used singly or in admixture. In the case where a plural number of inorganic substances are used, they may be physically mixed or may be in the form of a composite oxide, specifically $SiO_2$—$Al_2O_3$, etc.

In the invention, as the organic substance that is used in the hybrid layer, an organosilicon compound that is in the state of a liquid at normal temperature and at atmospheric pressure and/or an organic compound not containing silicon that is a liquid at normal temperature and at atmospheric pressure is used from the viewpoints of control of the film thickness and control of vapor deposition rate.

As the organosilicon compound, ones having, for example, a structure represented by any one of the following general formulae (a)-(d) are preferable.

In the general formulae (a) to (d), m and n each independently represents an integer of 0 or more; $X_1$ to $X_8$ each independently represents hydrogen, a saturated or unsaturated hydrocarbon group having from 1 to 6 carbon atoms, an —$OR^1$ group, a —$CH_2OR^2$ group, a —$COOR^3$ group, an —$OCOR^4$ group, an —$SR^5$ group, a —$CH_2SR^6$ group, an —$NR^7_2$ group, or a —$CH_2NR^8_2$ group; and $R^1$ to $R^8$ each represents hydrogen or a saturated or unsaturated hydrocarbon group having from 1 to 6 carbon atoms. $X_1$ to $X_8$ may be any arbitrary functional group as described previously, and all of them may be the same functional group, or a part or all of them may be different from each other without any limitations.

Specific examples of the hydrocarbon group having from 1 to 6 carbon atoms represented by $R^1$ to $R^8$ include a methyl group, an ethyl group, an n-propyl group, an isopropyl group, an n-butyl group, an isobutyl group, a pentyl group, a hexyl group, a vinyl group, an allyl group, an ethynyl group, a phenyl group, a cyclohexyl group, a propynyl group, and an isopropenyl group.

Specific examples of the compound represented by the general formula (a) include trimethylsilanol, diethylsilane, dimethylethoxysilane, hydroxymethyltrimethylsilane, methoxytrimethylsilane, dimethoxydimethylsilane, methyltrimethoxysilane, mercaptomethyltrimethoxysilane, tetramethoxysilane, mercaptomethyltrimethylsilane, aminomethyltrimethylsilane, dimethyldimethylaminosilane, ethynyltrimethylsilane, diacetoxymethylsilane, allyldimethylsilane, trimethylvinylsilane, methoxydimethylvinylsilane, acetoxy-trimethylsilane, trimethoxyvinylsilane, diethylmethylsilane, ethyltrimethylsilane, ethoxytrimethylsilane, diethoxymethylsilane, ethyltrimethoxysilane, dimethylaminotrimethylsilane, bis(dimethylamino)methylsilane, phenylsilane, dimethyldivinylsilane, 2-propynyloxytrimethylsilane, dimethyl-ethoxyethynylsilane, diacetoxydimethylsilane, allyltrimethylsilane, allyloxytrimethylsilane, ethoxydimethylvinylsilane, isopropenoxytrimethylsilane, allylaminotrimethylsilane, trimethylpropylsilane, trimethylisopropylsilane, triethylsilane, diethyidimethylsilane, butyldimethylsilane, trimethylpropoxysilane, trimethylisopropoxysilane, triethylsilanol, diethoxydimethylsilane, propyltrimethoxysilane, diethylaminodimethylsilane, bis(ethylamino)dimethylsilane, bis(dimethylamino)dimethylsilane, tri(dimethylamino)silane, methylphenylsilane, methyltrivinylsilane, diacetoxymethylvinylsilane, methyltriacetoxysilane, alloxydimethylvinylsilane, diethylmethylvinylsilane, diethoxymethylvinylsilane, bis(dimethylamino)methylvinylsilane, butyidimethylhydroxymethylsilane, 1-methylpropoxytrimethylsilane, isobutoxytrimethylsilane, butoxytrimethylsilane, butyltrimethoxysilane, methyltriethoxysilane, isopropylaminomethyltrimethylsilane, diethylaminotrimethylsilane, methyltri(dimethylamino)silane, dimethylphenylsilane, tetravinylsilane, triacetoxyvinylsilane, tetraacetoxysilane, ethyltriacetoxysilane, diallyidimethylsilane, 1,1-dimethylpropynyloxytrimethylsilane, diethoxydivinyl-silane, butyldimethylvinylsilane, dimethylisobutoxyvinylsilane, acetoxytriethylsilane, triethoxyvinylsilane, tetraethylsilane, dimethyldipropylsilane, diethoxydiethylsilane, dimethyldipropoxysilane, ethyltriethoxysilane, tetraethoxysilane, methylphenylvinylsilane, phenyltrimethylsilane, dimethylhydroxymethylphenylsilane, phenoxytrimethylsilane, dimethoxymethylphenylsilane, phenyltrimethoxysilane, anilinotrimethylsilane, 1-cyclohexenyloxytrimethylsilane, cyclohexyloxytrimethylsilane, dimethyl-isopentyloxyvinylsilane, allyltriethoxysilane, tripropylsilane, butyldimethyl-3-hydroxypropylsilane, hexyloxytrimethylsilane, propyltriethoxysilane, hexyltrimethoxysilane, dimethylphenylvinylsilane, trimethylsilylbenzonate, di-methylethoxyphenylsilane, methyltriisopropenoxysilane, meth-oxytripropylsilane, dibutoxydimethylsilane, methyltripropoxysilane, bis(butylamino)dimethylsilane, divinylmethylphenylsilane, diacetoxymethylphenylsilane, diethylmethylphenylsilane, diethoxymethylphenylsilane, triisopropoxyvinylsilane, 2-ethylhexyloxytrimethylsilane, pentyltriethoxysilane, diphenylsilane, phenyltrivinylsilane, triethylphenylsilane, phenyltriethoxysilane, tetraallyl-oxysilane, phenyltri(dimethylamino)silane, tetrapropoxysilane, tetraisopropoxysilane, diphenylmethylsilane, diallylmethylphenylsilane, dimethyldiphenylsilane, dimethoxydiphenylsilane, diphenylethoxymethylsilane, tripentyloxysilane, diphenyidivinylsilane, diacetoxydiphenylsilane, diethyidiphenylsilane, diethoxydiphenylsilane, bis(dimethyl-amino)diphenylsilane, tetrabutylsilane, tetrabutoxysilane, triphenylsilane, trihexylsilane, triphenoxyvinylsilane, diallyidiphenylsilane, 1,1,3,3-tetramethyldisiloxane, pentamethyldisiloxane, hexamethyldisiloxane, 1,3-dimethoxytetramethyldisiloxane, 1,3-diethynyl-1,1,3,3-tetramethyldisiloxane, 1,3-divinyl-1, 1,3,3-tetramethyldisiloxane, 1,3-diethoxytetramethyldisiloxane, hexaethyldisiloxane, and 1,3-dibutyl-1,1,3,3-tetramethyldisiloxane.

Examples of the compound of the general formula (b) include hexamethyldisilazane, 1,3-divinyl-1,1,3,3-tetramethyldisilazane, and 1,1,3,3-tetramethyldisilazane.

Examples of the compound of the general formula (c) include hexamethylcyclotrisiloxane, 1,1,3,3,5,5-hexamethylcyclotrisilazane, hexaethylcyclotrisiloxane, 1,3,5,7-tetramethylcyclotetrasiloxane, and octamethylcyclotetrasiloxane.

Examples of the compound of the general formula (d) include 1,1,3,3,5,5,7,7-octamethylcyclotetrasilazane.

The number average molecular weight of these organosilicon compounds is generally from 48 to 320, and preferably from 48 to 249 from the standpoints of control of the organic components in the hybrid film and strength of the film itself.

Next, as the organic compound not containing silicon, which constitutes the hybrid layer, ones containing a reactive group in the side chain or terminal end thereof and containing carbon and hydrogen as essential components, or ones containing a double bond are preferable. Specifically, compounds represented by the general formulae (e)-(g) may be used.

In the general formulae (e) and (f), $R^9$ represents a hydrocarbon group having from 1 to 10 carbon atoms, which may contain nitrogen or oxygen, and $R^{10}$ represents a divalent hydrocarbon group having from 1 to 7 carbon atoms, which may contain oxygen; and in the general formula (g), $X_9$ to $X_{12}$ each represents hydrogen, a hydrocarbon group having from 1 to 10 carbon atoms, or an organic group having from 1 to 10 carbon atoms and containing carbon and hydrogen as essential components and further containing at least one of oxygen and nitrogen as an essential component.

Specific examples of the compound of the general formula (e) include methyl glycidyl ether, butyl glycidyl ether, 2-ethylhexyl glycidyl ether, decyl glycidyl ether, stearyl glycidyl ether, allyl glycidyl ether, phenyl glycidyl ether, p-sec-butylphenyl glycidyl ether, p-tert-butylphenyl glycidyl ether, 2-methyloctyl glycidyl ether, glycidol, and trimethylolpropane polyglycidyl ether. Specific examples of the compound of the general formula (f) include neopentyl glycol diglycidyl ether, glycerol diglycidyl ether, propylene glycol diglycidyl ether, tripropylene glycol diglycidyl ether, polypropylene glycol diglycidyl ether, 1,6-hexanediol diglycidyl ether, ethylene glycol diglycidyl ether, diethylene glycol diglycidyl ether, and polyethylene glycol diglycidyl ether.

Specific examples of the compound of the general formula (g) include vinylpyrrolidone, vinylcarbazole, methyl methacrylate, ethyl methacrylate, benzyl methacrylate, n-butyl methacrylate, isobutyl methacrylate, dimethylaminoethyl methacrylate, methacrylic acid, glycidyl methacrylate, vinyl acetate, and styrene.

Also, the number average molecular weight of the compounds represented by the foregoing general formulae (e) to (g) is generally from 28 to 320, and preferably from 28 to 249 while taking into account the control of the organic components in the hybrid film and the strength of the hybrid film.

Figure 1:
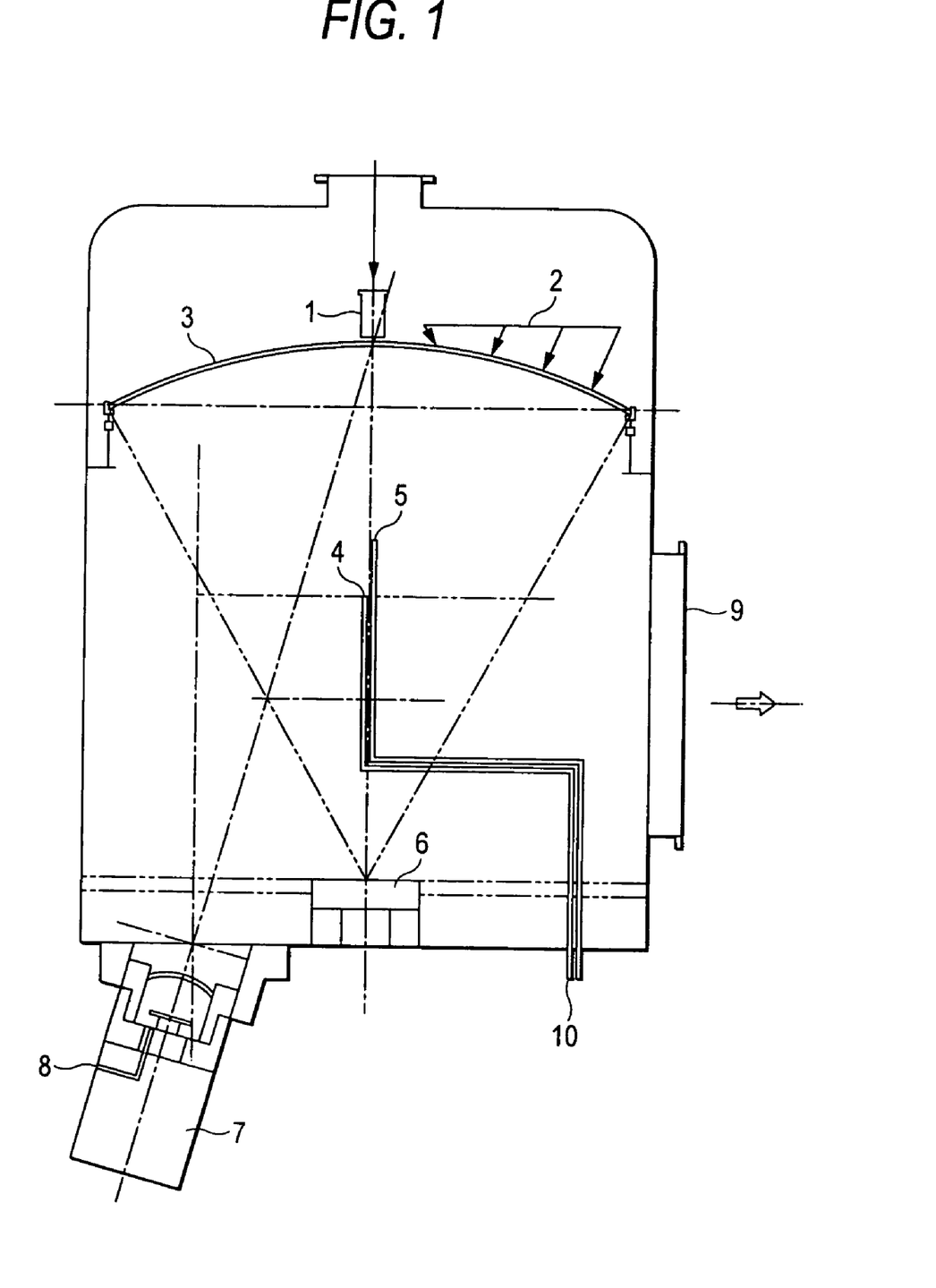

In the invention, as the method of forming a film of the organosilicon compound and/or the organic compound not containing silicon (hereinafter sometimes referred to as "organic substance"), in forming the hybrid layer, the inorganic substance and the organic substance may be subjected to vapor deposition simultaneously with separate vapor deposition sources to form a film as shown in FIG. 1.

Also, it is preferable from the viewpoint of control of the vapor deposition rate that an external tank in which the organic substance is stored is heated and reduced in pressure to feed the organic substance into a chamber, and a film is formed by ion beam assisted deposition using an oxygen gas and/or an argon gas.

Also, in the invention, the organic substance is a liquid at normal temperature and at atmospheric pressure and can be subjected to vapor deposition by direct heating without necessity of use of a solvent.

As shown in FIG. 1, it is effective for improving the impact resistance and abrasion resistance to provide an inlet of the organic substance just above a vapor deposition source of the inorganic substance, and it is preferable to feed the organosilicon compound from the lower portion and the organic compound not containing silicon from the upper portion, respectively.

The heating temperature of the external tank varies depending on the evaporating temperature of the organic substance but may be set up at, for example, from 30 to 200° C., and preferably from 50 to 150° C. from the standpoint of obtaining a proper vapor deposition rate.

In the invention, the content in the film of the organic substance of the hybrid layer is preferably from 0.02% by weight to 25% by weight while taking into account an especially good modifying effect of physical properties.

In the invention, with respect to the constitution of the multilayered antireflection film to be formed on the plastic substrate, the hybrid layer is used in at least one layer of the film constitution.

The hybrid layer can be formed in an arbitrary layer in the multilayered antireflection film. Also, the hybrid layer can be formed in a plural number of the layers. In order to obtain especially excellent impact resistance, it is preferable that the hybrid layer is provided in the position most close to the lens substrate and/or the position most far from the lens substrate. Also, in order to obtain especially excellent adhesiveness, it is preferable that the hybrid layer is formed by ion beam assisted deposition.

In the ion beam assisted deposition, with respect to an output, it is especially preferable from the viewpoint of obtaining good reaction that an accelerating voltage is in the range of from 50 to 700 V and that an accelerating current is in the range of from 30 to 250 mA. As ionized gases that are used in carrying out the ion beam assisted deposition, argon (Ar) or a mixed gas of argon and oxygen is preferably used from the standpoints of reactivity and oxidation prevention during the film formation.

Also, in the optical member of the invention, for the sake of improving the adhesiveness, a layer made of a metal having a catalytic action in forming the hybrid layer, for example, at least one member selected from nickel (Ni), silver (Ag), platinum (Pt), niobium (Nb), and titanium (Ti), can be provided as an undercoat beneath the antireflection film. A particularly preferred undercoat is a metallic layer made of niobium from the viewpoint that better impact resistance can be imparted.

In the case where the foregoing metallic layer is used as the undercoat, the impact resistance of the optical member is in general improved.

Also, the film thickness of the undercoat is not particularly limited but is preferably in the range of from 1 to 5 nm from the viewpoint of obtaining lenses having good impact resistance and transmittance.

The material of the plastic substrate that is used in the invention is not particularly limited. Examples include methyl methacrylate homopolymers, copolymers of methyl methacrylate and at least one other monomer, diethylene glycol bisallyl carbonate homopolymers, copolymers of diethylene glycol bisallyl carbonate and at least one other monomer, sulfur-containing copolymers, halogen copolymers, polycarbonates, polystyrenes, polyvinyl chlorides, unsaturated polyesters, polyethylene terephthalate, polyurethanes, polythiourethanes, and a polymer formed by polymerizing a compound containing an epithio group.

Examples of a compound containing an epithio group include chain organic compounds such as bis(β-epithiopropylthio)methane, 1,2-bis(β-epithiopropylthio)ethane, 1,3-bis(β-epithiopropylthio)propane, 1,2-bis(β-epi-thiopropylthio)propane, 1-(β-epithiopropylthio)-2-(β-epithiopropylthiomethyl)propane, 1,4-bis(β-epithiopropylthio) butane, 1,3-bis(β-epithiopropylthio)butane, 1-(β-epithiopropylthio)-3-(β-epithiopropylthiomethyl)-butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, and 1-(β-epithiopropylthio)-2-[[2-(2-β-epithiopropylthioethyl)thioethyl]thio]ethane.

Also, there are enumerated branched organic compounds such as tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropythio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-trs(β-epithiopropylthiomethyl)-3,6-dithiaoctane, 1,8-bis(β-epithiopropylthio )-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithia-nonane, 1,10-bis(β-epithiopropylthio)-5,6-bis[(2-1-epithiopropylthioethyl)thio]-3,6,9-trithiadecane, 1,11-bis(β-epithiopropylthio)-4,8-bis(β-epithiopropylthio-methyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane, and 1,11-bis(β-epithiopropylthio)-4,7-bis (β-epithiopropylthiomethyl)-3,6,9-trithiaundecane, and compounds resulting from substitution of at least one hydrogen in the episulfide group in these compounds with a methyl group.

Further, there are enumerated cyclic aliphatic organic compounds such as 1,3- or 1,4-bis(β-epithiopropylthio)cyclohexane, 1,3- or 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithiane, and 2,5-bis(β-epithiopropylthioethylthiomethyl)-1,4-dithiane, and compounds resulting from substitution of at least one hydrogen in the episulfide group in these compounds with a methyl group; and aromatic organic compounds such as 1,3- or 1,4-bis(β-epithiopropylthio)benzene, 1,3- or 1,4-bis(β-epithiopropylthiomethyl)benzene, bis[4-(β-epithiopropylthio)phen-yl] methane, 2,2-bis[4-(β-epithiopropylthio)phenyl]propane, bis[4-(β-epithiopropylthio)phenyl]sulfide, bis[4-(β-epithiopropylthio)phenyl]sulfone, and 4,4'-bis(β-epithiopropylthio)biphenyl, and compounds resulting from substitution of at least one hydrogen in the episulfide group in these compounds with a methyl group.

The optical member of the invention may have a cured coating film between the plastic substrate and the undercoating.

As the cured coating film, a composition comprising metal oxide colloid particles and an organosilicon compound represented by the following general formula (I) is generally used.

$$(R^{11})_a(R^{12})_b Si(OR^{13})_{4-(a+b)} \qquad (I)$$

In the formula, $R^{11}$ and $R^{12}$ each independently represents an organic group selected from an alkyl group having from 1 to 8 carbon atoms, an alkenyl group having from 2 to 8 carbon atoms, an aryl group having from 6 to 8 carbon atoms, an acyl group having from 1 to 8 carbon atoms, a halogen group, a glycidoxy group, an epoxy group, an amino group, a phenyl group, a mercapto group, a methacryloxy group, and a cyano group; $R^{13}$ represents an organic group selected from an alkyl group having from 1 to 8 carbon atoms, an acyl group having from 1 to 8 carbon atoms, and a phenyl group having from 6 to 8 carbon atoms; and a and b each independently represents an integer of 0 or 1, Examples of the metal oxide colloid particles include tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), and antimony oxide ($Sb_2O_5$). These metal oxide colloid particles can be used singly or in admixture of two or more thereof.

With respect to a coating liquid for preparing the cured coating film, the liquid can be prepared by the conventionally known method. If desired, curing catalysts and various organic solvents and surfactants for the purposes of improving wettability at the time of coating and improving smoothness of the cured coating film can also be contained. Further, ultraviolet ray absorbers, antioxidants, photostabilizers, age resistors, and the like can be added so far as physical properties of the coating composition and the cured coating film are not affected.

Curing of the coating composition is carried out by hot air drying or active energy ray irradiation, and with respect to the curing condition, the curing is suitably carried out in hot air preferably at from 70 to 200° C., and particularly preferably at from 90 to 150° C. Incidentally, examples of the active energy rays include far infrared rays, and damages by heat can be suppressed to a low level.

Also, as the method of forming the cured film comprising a coating composition on the substrate, there is enumerated a method of coating the coating composition on the substrate. As the coating measure, usually employed methods such as dipping, spin coating, and spraying can be applied. Of these measures, dipping and spin coating are especially preferable from the standpoint of profile irregularity.

Also, for the sake of ensuring adhesiveness between the plastic substrate and the undercoating or designing to unify the initial film forming state of the vapor deposition substance, the surface of the cured coating film may be subjected to treatment with an ionized gas. As the ionized gas in the pre-treatment by an ion gun, oxygen, argon (Ar), etc. can be used. With respect to an output, it is especially preferable from the viewpoint of obtaining good adhesiveness and abrasion resistance that an accelerating voltage is in the range of from 50 to 700 V and that an accelerating current is in the range of from 50 to 250 mA.

In the invention, it is possible to provide a primer layer made of an organic compound between the plastic substrate and the antireflection film as described in the above cited Patent Document 1. For the sake of further improving the impact resistance, a primer layer made of an organic compound as the raw material may be provided between the plastic substrate and the antireflection film, or between the plastic substrate and the cured coating film.

Examples of the primer layer include ones of forming a urethane based film made of a polyisocyanate and a polyol as raw materials. Examples of polyisocyanates include adducts resulting from bonding several molecules of hexamethylene diisocyanate, 4,4'-cyclohexylmethane diisocyanate, and hydrogenated xylylene diisocyanate by various methods and ones resulting from blocking isocyanurate, allophanate, biuret, or carbodiimide with acetoacetic acid, malonic acid, methyl ethyl ketoxime, etc. On the other hand, examples of polyols include polyesters, polyethers, polycaprolactones, polycarbonates, and polyacrylates each having a plural number of hydroxyl groups in one molecule.

Also, for the sake of improving the refractive index of the primer film, metal oxide fine particles such as titanium oxide fine particles can be contained in the primer layer.

Especially, by providing the primer layer in the polysulfide bond-containing plastic substrate having a refractive index of from about 1.68 to 1.76 and further providing the antireflection film of the invention, it is possible to obtain an optical member having excellent impact resistance, adhesiveness and resistance to scuffing even when the center thickness of the substrate is small.

With respect to the constitution of the primer layer and the cured layer in the optical member, it is preferable to provide the primer layer and the cured layer in this order from the plastic substrate between the plastic substrate and the antireflection film.

EXAMPLES

The invention will be specifically described below with reference to the following Examples, but it should not be construed that the invention is limited thereto.

Incidentally, the physical properties of the optical members obtained in the Examples and Comparative Examples were evaluated in the following methods.

Evaluation of Physical Properties (1) Luminous Transmittance:

With respect to a plastic lens having an antireflection film on the both surfaces thereof as a sample, a luminous transmittance $Y_1$ of the plastic lens was measured using a Hitachi's spectrophotometer U-3410.

(2) Luminous Reflectance:

With respect to a plastic lens having an antireflection film on the both surfaces thereof as a sample, a luminous reflectance $Y_2$ of the plastic lens was measured using a Hitachi's spectrophotometer U-3410.

(3) Impact Resistance:

A lens having a lens diopter 0.00D and having a lens center thickness (hereinafter referred to as "CT") of 1.0 mm or 2.0 mm was prepared and subjected to drop ball test defined in FDA (Food and Drug Administration), and the acceptance was expressed by "◯", whereas the rejection was expressed by "X". Incidentally, the ball had a weight of 14 g. Further, the drop ball test was continued until the lens had been broken, thereby confirming the strength as a maximum load.

(4) Adhesiveness:

One hundred cells of 1 mm×1 mm were prepared on the surface of a plastic lens using a cutter knife, a cellophane adhesive tape (manufactured by Nichiban Co., Ltd.) was stuck on the cells, and the tape was then peeled away at one stroke, thereby evaluating the adhesiveness in terms of the number of remaining cells. In the table, the number of remaining cells per 100 cells was designated.

(5) Abrasion Resistance:

The surface of a plastic lens was rubbed at 10 strokes by a steel wool (specification: #0000, manufactured by Nippon Steel Wool Co., Ltd.) while applying a load of 1 kgf/cm² and evaluated with respect to the surface state according to the following criteria.

UA: Scuffs were not substantially present.
A: Several fine scuffs were present.
B: A number of fine scuffs and several thick scuffs were present
C: A number of fine scuffs and a number of thick scuffs were present.
D: The film was substantially stripped away.

(6) Heat Resistance:

A plastic lens was heated in a dry oven for one hour while elevating the temperature at a rate of 5° C. from 60° C., thereby measuring a temperature at which cracks were generated.

(7) Alkali Resistance:

A plastic lens was dipped in a 10% NaOH aqueous solution at 20° C. for one hour and evaluated with respect to the surface state according to the following criteria.

UA: The plastic lens did not substantially change.
A: Spot-like film stripping was found in several portions.
B: Spot-like film stripping was entirely found.
C: Spot-like film stripping was entirely found, and planar film stripping was found in several portions.
D: Film stripping was substantially entirely found.

(8) Measurement of Bayer Value:

A Bayer value was measured according to a difference in change of the haze value from a standard lens using an abrasion tester, BTE™@Abrasion Tester (manufactured by Colts Laboratories, USA) and a haze value analyzer (manufactured by Murakami Color Research Laboratory). A Bayer value is the result of a standard test comparing the haze value of a standard lens compared to the haze value of a test lens. A lens having a higher Bayer value has better abrasion resistance. For example, a value of 2.0 means that the test lens abraded two times less than the standard lens.

Sample Number and Measurement Method (1) Three standard lenses (CR39 substrates) and three sample lenses were prepared.
(2) The haze value before the abrasion test was measured.

(3) The abrasion properties were tested using a BTE™@Abrasion Tester (600 reciprocations of surface abrasion by sand).

(4) The haze value after the abrasion test was measured.

(5) The Bayer value was calculated (an average value of three lenses). The Bayer value as referred to herein means [(change in haze value of standard lens)/(change in haze value of sample lens)].

Plastic Lens Substrate to be Used (1) Substrate A: Diethylene glycol bisallyl carbonate having a refractive index of 1.50, a center thickness of 2.0 mm and a lens diopter of 0.00.

(2) Substrate B: EYRY substrate (a trade name of Hoya Corporation having a polysulfide bond) having a refractive index of 1.71, a center thickness of 1.0 mm and a lens diopter of 0.00.

Preparation of Coating Composition A

In a glass container, a liquid containing 90 parts by weight of colloidal silica (SNOWTEX-40 manufactured by Nissan Chemical Industries, Ltd.), 81.6 parts by weight of methyltrimethoxysilane as the organosilicon compound, 176 parts by weight of γ-glycidoxypropyltrimethoxysilane, 2.0 parts by weight of 0.5 N hydrochloric acid, 20 parts by acetic acid, and 90 parts by weight of water was stirred at room temperature for 8 hours and then allowed to stand at room temperature for 16 hours to obtain a hydrolytic solution. To this solution, 120 parts by weight of isopropyl alcohol, 120 parts by weight of n-butyl alcohol, 16 parts by weight of aluminum acetylacetone, 0.2 parts by weight of a silicone based surfactant, and 0.1 parts by weight of an ultraviolet ray absorber were added, and the mixture was stirred at room temperature for 8 hours and then ripened at room temperature for 24 hours to obtain a coating liquid. A cured film obtained from this coating composition is hereinafter sometimes referred to as "hard coat layer A".

Preparation of Coating Composition B

In a glass container, 1,045 parts by weight of γ-glycidoxypropyl(-trimethoxy)silane and 200 parts by weight of γ-glycidoxypropyl-methyl(diethoxy)silane were charged, to which was then added 299 parts by weight of 0.01 moles/L hydrochloric acid while stirring. Stirring was continued a whole day and night in a clean room at 10° C. to obtain a silane hydrolyzate.

In another container, 4,018 parts by weight of methyl cellosolve and 830 parts by weight of isopropanol were added to 3,998 parts by weight of a composite fine particle sol composed mainly of titanium oxide, zirconium oxide and silicon oxide (dispersed in methanol, total solids content: 30% by weight, mean particle size: from 5 to 8 μm) and stirred and mixed. Further, 4 parts by weight of a silicone based surfactant ("L-7001" manufactured by Nippon Unicar Co., Ltd.) and 100 parts by weight of acetylacetonatoaluminum were added to the mixture. Stirring was continued a whole day and night in a clean room at 10° C. in the same manner as described previously. The reaction mixture was mixed with the foregoing hydrolyzate, and the mixture was further stirred a whole day and night. Thereafter, the reaction mixture was filtered through a 3 μm-filter to obtain a hard coating liquid B. A cured film obtained from this coating composition is hereinafter sometimes referred to as "hard coat layer B".

Formation of Cured Film

The plastic lens substrate A or B having been pre-treated with an alkaline aqueous solution was dipped in the foregoing coating liquid and after completion of dipping, lifted at a lifting rate of 20 cm/min. The resulting plastic lens was heated at 120° C. for 2 hours to form a cured film (the hard coat layer A or heard coat layer B).

Ion Gun Treatment

The cured film was ion irradiated by an ion gun under the conditions of ion accelerating voltage, irradiation time and gas atmosphere as shown in the table.

Formation of Antireflection Film having Hybrid Film

An antireflection film comprising from first to seventh layers was formed on the ion irradiated hard coat layer A or layer B under the conditions shown in Table 1, to obtain a plastic lens.

Incidentally, the hybrid layer was formed by binary vapor deposition of vapor deposition with an inorganic substance and vapor deposition with an organic substance using a device shown in FIG. 1 while setting up the condition so as to carry out the vapor deposition substantially simultaneously. In the vapor deposition with an organic substance, the organic substance was vaporized in an external heating tank and then introduced into the vapor deposition device using a gas valve and a mass flow controller. In the formation of the hybrid layer, ion beam assisted deposition was employed in an atmosphere of a mixed gas of an argon gas and an oxygen gas. Also, the expression "–" in the table means that the layer was formed by usual vacuum deposition without using the ion beam assisted deposition. In the table, M1, CM1 and CM2 stand for an inorganic substance, an organosilicon compound, and an organic compound not containing silicon, respectively.

The details of the organic compounds described in the table are as follows.

(1) Epolite 70P (propylene glycol diglycidyl ether, molecular weight: about 188, manufactured by Kyoeisha Chemical Co., Ltd.)

(2) LS:1370 (diethoxydimethylsilane, molecular weight: 148.3, manufactured by Shin-Etsu Chemical Co., Ltd.)

(3) Epiol P200 (polypropylene glycol glycidyl ethen, average molecular weight: about 304, manufactured by NOF Corporation)

Incidentally, in Examples 5, 6, 9 and 10 and Comparative Examples 3 and 4, a primer layer was provided between the substrate and the cured coating film. The method of forming the primer layer is as follows.

Formation of Primer Layer

A mixture consisting of 6.65 parts by weight of a polyester type polyol (Desmophene A-670, a trade name of Sumitomo Bayer Urethane Co., Ltd.), 6.08 parts by weight of a block type polyisocyanate (BL-3175, a trade name of Sumitomo Bayer Urethane Co., Ltd.), 0.17 parts by weight of dibutyltin dilaurate as a curinh catalyst, 0.17 parts by weight of a fluorine based leveling agent (Fluorad FC-430, a trade name of Sumitomo 3M Limited) as a leveling agent, and 95.71 parts by weight of discetone alcohol as a solvent was thoroughly stirred until the mixture became uniform. The resulting liquid primer was coated on the substrate lens having been pre-treated with an alkaline aqueous solution by dipping (lifting rate: 24 cm/min) and then heated for curing at 100° C. for 40 minutes to form a primer layer having a thickness of from 2 to 3 μm.

Examples 1 and 10 and Comparative Examples 1 to 4

An antireflection film was provided on a substrate according to the constitution shown in Tables 1-1 to 1-14, and physical properties were evaluated. The results are shown in Table 2. Incidentally, the expression "λ" means a wavelength of light.

TABLE 1-1

Constitution of antireflection film

Example 1

| | | |
|---|---|---|
| Plastic lens substrate | Substrate A | |
| Hard coat layer | Layer A | |
| Ion gun for pre-treatment Setting condition | Accelerating voltage: 400 V, accelerating current: 170 mA | |
| | 60 sec (treatment time) | |
| Gas used | Oxygen gas 10 sccm + Argon gas 10 sccm | |

| | Substance used, film thickness | Setting values of ion gun |
|---|---|---|
| First layer | Film thickness: 0.438λ<br>Refractive index: 1.468<br>M1: $SiO_2$<br>CM1: LS:1370 20 sccm<br>CM2: Epiol P200 50 sccm | Accelerating voltage: 200 V<br>Accelerating current: 120 mA<br>$O_2$: 10 sccm<br>Ar: 10 sccm |
| Second layer | $Nb_2O_5$: 0.0505λ | — |
| Third layer | Film thickness: 0.110λ<br>Refractive index: 1.468<br>M1: $SiO_2$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Fourth layer | $Nb_2O_5$: 0.1357λ | — |
| Fifth layer | Film thickness: 0.0689λ<br>Refractive index: 1.468<br>M1: $SiO_2$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Sixth layer | $Nb_2O_5$: 0.1357λ | — |
| Seventh layer | Film thickness: 0.271λ<br>Refractive index: 1.468<br>M1: $SiO_2$<br>CM1: LS:1370 20 sccm<br>CM2: Epiol P200 50 sccm | Accelerating voltage: 200 V<br>Accelerating current: 120 mA<br>$O_2$: 10 sccm<br>Ar: 10 sccm |

TABLE 1-2

Constitution of antireflection film

Example 2

| | | |
|---|---|---|
| Plastic lens substrate | Substrate A | |
| Hard coat layer | Layer A | |
| Ion gun for pre-treatment Setting condition | Accelerating voltage: 400 V, accelerating current: 170 mA | |
| | 60 sec (treatment time) | |
| Gas used | Oxygen gas 10 sccm + Argon gas 10 sccm | |

| | Substance used, film thickness | Setting values of ion gun |
|---|---|---|
| First layer | Film thickness: 0.488λ<br>Refractive index: 1.471<br>M1: $SiO_2$ + $Al_2O_3$<br>CM1: LS:1370 20 sccm<br>CM2: Epiol P200 50 sccm | Accelerating voltage: 200 V<br>Accelerating current: 120 mA<br>$O_2$: 10 sccm<br>Ar: 10 sccm |
| Second layer | $Nb_2O_5$: 0.055λ | — |
| Third layer | Film thickness: 0.115λ<br>Refractive index: 1.471<br>M1: $SiO_2$ + $Al_2O_3$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |

TABLE 1-2-continued

Constitution of antireflection film

| | | |
|---|---|---|
| Fourth layer | $Nb_2O_5$: 0.1427λ | — |
| Fifth layer | Film thickness: 0.0740λ<br>Refractive index: 1.471<br>M1: $SiO_2$ + $Al_2O_3$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Sixth layer | $Nb_2O_5$: 0.128λ | — |
| Seventh layer | Film thickness: 0.275λ<br>Refractive index: 1.471<br>M1: $SiO_2$ + $Al_2O_3$<br>CM1: LS:1370 20 sccm<br>CM2: Epiol P200 50 sccm | Accelerating voltage: 200 V<br>Accelerating current: 120 mA<br>$O_2$: 10 sccm<br>Ar: 10 sccm |

TABLE 1-3

Constitution of antireflection film

Example 3

| | | |
|---|---|---|
| Plastic lens substrate | Substrate A | |
| Hard coat layer | Layer A | |
| Ion gun for pre-treatment | Accelerating voltage: 400 V, Accelerating current: 170 mA | |
| Setting condition | 60 sec (treatment time) | |
| Gas used | Oxygen gas 10 sccm + Argon gas 10 sccm | |

| | Substance used, film thickness | Setting values of ion gun |
|---|---|---|
| First layer | Film thickness: 0.438λ<br>Refractive index: 1.468<br>M1: $SiO_2$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Second layer | Film thickness: 0.035λ<br>Refractive index: 2.13<br>M1: $Nb_2O_5$<br>CM1: LS:1370 5 sccm<br>CM2: Epiol P200 5 sccm | Accelerating voltage: 200 V<br>Accelerating current: 120 mA<br>$O_2$: 20 sccm |
| Third layer | Film thickness: 0.110λ<br>Refractive index: 1.468<br>M1: $SiO_2$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Fourth layer | Film thickness: 0.1320λ<br>Refractive index: 2.13<br>M1: $Nb_2O_5$<br>CM1: LS:1370 5 sccm<br>CM2: Epiol P200 5 sccm | Accelerating voltage: 200 V<br>Accelerating current: 120 mA<br>$O_2$: 20 sccm |
| Fifth layer | Film thickness: 0.0689λ<br>Refractive index: 1.468<br>M1: $SiO_2$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Sixth layer | Film thickness: 0.1220λ<br>Refractive index: 2.13<br>M1: $Nb_2O_5$<br>CM1: LS:1370 5 sccm<br>CM2: Epiol P200 5 sccm | Accelerating voltage: 200 V<br>Accelerating current: 120 mA<br>$O_2$: 20 sccm |
| Seventh layer | Film thickness: 0.271λ<br>Refractive index: 1.468<br>M1: $SiO_2$<br>CM1: LS:1370 20 sccm<br>CM2: Epiol P200 50 sccm | Accelerating voltage: 200 V<br>Accelerating current: 120 mA<br>$O_2$: 10 sccm<br>Ar: 10 sccm |

TABLE 1-4

Constitution of antireflection film

Example 4

| | |
|---|---|
| Plastic lens substrate | Substrate A |
| Hard coat layer | Layer A |
| Ion gun for pre-treatment | Accelerating voltage: 400 V, accelerating current: 170 mA |
| Setting condition | 60 sec (treatment time) |
| Gas used | Oxygen gas 10 sccm + Argon gas 10 sccm |

| | Substance used, film thickness | Setting values of ion gun |
|---|---|---|
| First layer | Film thickness: 0.488λ<br>Refractive index: 1.471<br>M1: $SiO_2$ + $Al_2O_3$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Second layer | Film thickness: 0.035λ<br>Refractive index: 2.13<br>M1: $Nb_2O_5$<br>CM1: LS:1370 5 sccm<br>CM2: Epiol P200 5 sccm | Accelerating voltage: 200 V<br>Accelerating current: 120 mA<br>$O_2$: 20 sccm |
| Third layer | Film thickness: 0.115λ<br>Refractive index: 1.471<br>M1: $SiO_2$ + $Al_2O_3$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Fourth layer | Film thickness: 0.1421λ<br>Refractive index: 2.13<br>M1: $Nb_2O_5$<br>CM1: LS:1370 5 sccm<br>CM2: Epiol P200 5 sccm | Accelerating voltage: 200 V<br>Accelerating current: 120 mA<br>$O_2$: 20 sccm |
| Fifth layer | Film thickness: 0.0740λ<br>Refractive index: 1.471<br>M1: $SiO_2$ + $Al_2O_3$<br>CM1: LS:1370 20 sccm<br>CM2: Epiol P200 20 sccm | Accelerating voltage: 200 V<br>Accelerating current: 120 mA<br>$O_2$: 10 sccm<br>Ar: 10 sccm |
| Sixth layer | Film thickness: 0.1184λ<br>Refractive index: 2.13<br>M1: $Nb_2O_5$<br>CM1: LS:1370 5 sccm<br>CM2: Epiol P200 5 sccm | Accelerating voltage: 200 V<br>Accelerating current: 120 mA<br>$O_2$: 20 sccm |
| Seventh layer | Film thickness: 0.275λ<br>Refractive index: 1.471<br>M1: $SiO_2$ + $Al_2O_3$<br>CM1: LS:1370 20 sccm<br>CM2: Epiol P200 50 sccm | Accelerating voltage: 200 V<br>Accelerating current: 120 mA<br>$O_2$: 10 sccm<br>Ar: 10 sccm |

TABLE 1-5

Constitution of antireflection film

Example 5

| | |
|---|---|
| Plastic lens substrate | Substrate B |
| Hard coat layer | Layer B (A primer layer is present between the lens substrate and the layer B) |
| Ion gun for pre-treatment | Accelerating voltage: 400 V, accelerating current: 170 mA |
| Setting condition | 60 sec (treatment time) |
| Gas used | Oxygen gas 10 sccm + Argon gas 10 sccm |

| | Substance used, film thickness | Setting values of ion gun |
|---|---|---|
| First layer | Film thickness: 0.0534λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Second layer | $Nb_2O_5$: 0.0319λ | Accelerating voltage: 450 V<br>Accelerating current: 180 mA<br>$O_2$: 20 sccm |
| Third layer | Film thickness: 0.5452λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Fourth layer | $Nb_2O_5$: 0.1001λ | Accelerating voltage: 450 V<br>Accelerating current: 180 mA<br>$O_2$: 20 sccm |
| Fifth layer | Film thickness: 0.1094λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Sixth layer | $Nb_2O_5$: 0.1497λ | Accelerating voltage: 450 V<br>Accelerating current: 180 mA<br>$O_2$: 20 sccm |
| Seventh layer | Film thickness: 0.2892λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |

CM1 & CM2: Values set up by $N_2$-calibrated FMC

TABLE 1-6

Constitution of antireflection film

Example 6

| | |
|---|---|
| Plastic lens substrate | Substrate B |
| Hard coat layer | Layer B (A primer layer is present between the lens substrate and the layer B) |
| Ion gun for pre-treatment | Accelerating voltage: 400 V, accelerating current: 170 mA |
| Setting condition | 60 sec (treatment time) |
| Gas used | Oxygen gas 10 sccm + Argon gas 10 sccm |

| | Substance used, film thickness | Setting values of ion gun |
|---|---|---|
| First layer | Film thickness: 0.0534λ<br>Refractive index: 1.471<br>M1: $SiO_2$ + $Al_2O_3$<br>CM2: Epolite 70P 20 sccm | Accelerating voltage: 200 V<br>Accelerating current: 120 mA<br>$O_2$: 10 sccm<br>Ar: 10 sccm |
| Second layer | $Nb_2O_5$: 0.0319λ | Accelerating voltage: 450 V<br>Accelerating current: 180 mA<br>$O_2$: 20 sccm |
| Third layer | Film thickness: 0.5680λ<br>Refractive index: 1.471<br>M1: $SiO_2$ + $Al_2O_3$<br>CM2: Epolite 70P 20 sccm | Accelerating voltage: 100 V<br>Accelerating current: 70 mA<br>$O_2$: 10 sccm<br>Ar: 10 sccm |
| Fourth layer | $Nb_2O_5$: 0.0908λ | Accelerating voltage: 450 V<br>Accelerating current: 180 mA<br>$O_2$: 20 sccm |
| Fifth layer | Film thickness: 0.0992λ<br>Refractive index: 1.471<br>M1: $SiO_2$ + $Al_2O_3$<br>CM2: Epolite 70P 20 sccm | Accelerating voltage: 200 V<br>Accelerating current: 120 mA<br>$O_2$: 10 sccm<br>Ar: 10 sccm |
| Sixth layer | $Nb_2O_5$: 0.158λ | Accelerating voltage: 450 V<br>Accelerating current: 180 mA<br>$O_2$: 20 sccm |
| Seventh layer | Film thickness: 0.2902λ<br>Refractive index: 1.471<br>M1: $SiO_2$ + $Al_2O_3$<br>CM2: Epolite 70P 20 sccm | Accelerating voltage: 200 V<br>Accelerating current: 120 mA<br>$O_2$: 10 sccm<br>Ar: 10 sccm |

CM1 & CM2: Values set up by $N_2$-calibrated FMC

TABLE 1-7

Constitution of antireflection film

Example 7

| | | |
|---|---|---|
| Plastic lens substrate | Substrate A | |
| Hard coat layer | Layer A | |
| Ion gun for pre-treatment | Accelerating voltage: 400 V, accelerating current: 170 mA | |
| Setting condition | 60 sec (treatment time) | |
| Gas used | Oxygen gas 10 sccm + Argon gas 10 sccm | |

| | Substance used, film thickness | Setting values of ion gun |
|---|---|---|
| First layer | Film thickness: 0.0534λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Second layer | $Nb_2O_5$: 0.0319λ | Accelerating voltage: 450 V<br>Accelerating current: 180 mA<br>$O_2$: 20 sccm |
| Third layer | Film thickness: 0.5452λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Fourth layer | $Nb_2O_5$: 0.1001λ | Accelerating voltage: 450 V<br>Accelerating current: 180 mA<br>$O_2$: 20 sccm |
| Fifth layer | Film thickness: 0.1094λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Sixth layer | $Nb_2O_5$: 0.1497λ | Accelerating voltage: 450 V<br>Accelerating current: 180 mA<br>$O_2$: 20 sccm |
| Seventh layer | Film thickness: 0.2892λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |

TABLE 1-8

Constitution of antireflection film

Example 8

| | | |
|---|---|---|
| Plastic lens substrate | Substrate A | |
| Hard coat layer | Layer A | |
| Ion gun for pre-treatment | Accelerating voltage: 400 V, accelerating current: 170 mA | |
| Setting condition | 60 sec (treatment time) | |
| Gas used | Oxygen gas 10 sccm + Argon gas 10 sccm | |

| | Substance used, film thickness | Setting values of ion gun |
|---|---|---|
| First layer | Film thickness: 0.0534λ<br>Refractive index: 1.471<br>M1: $SiO_2 + Al_2O_3$<br>CM2: Epolite 70P 20 sccm | Accelerating voltage: 200 V<br>Accelerating current: 120 mA<br>$O_2$: 10 sccm<br>Ar: 10 sccm |
| Second layer | $Nb_2O_5$: 0.0319λ | Accelerating voltage: 450 V<br>Accelerating current: 180 mA<br>$O_2$: 20 sccm |
| Third layer | Film thickness: 0.5680λ<br>Refractive index: 1.471<br>M1: $SiO_2 + Al_2O_3$<br>CM2: Epolite 70P 20 sccm | Accelerating voltage: 100 V<br>Accelerating current: 70 mA<br>$O_2$: 10 sccm<br>Ar: 10 sccm |
| Fourth layer | $Nb_2O_5$: 0.0908λ | Accelerating voltage: 450 V<br>Accelerating current: 180 mA<br>$O_2$: 20 sccm |
| Fifth layer | Film thickness: 0.0992λ<br>Refractive index: 1.471<br>M1: $SiO_2 + Al_2O_3$<br>CM2: Epolite 70P 20 sccm | Accelerating voltage: 200 V<br>Accelerating current: 120 mA<br>$O_2$: 10 sccm<br>Ar: 10 sccm |
| Sixth layer | $Nb_2O_5$: 0.158λ | Accelerating voltage: 450 V<br>Accelerating current: 180 mA<br>$O_2$: 20 sccm |
| Seventh layer | Film thickness: 0.2902λ<br>Refractive index: 1.471<br>M1: $SiO_2 + Al_2O_3$<br>CM2: Epolite 70P 20 sccm | Accelerating voltage: 200 V<br>Accelerating current: 120 mA<br>$O_2$: 10 sccm<br>Ar: 10 sccm |

TABLE 1-9

Constitution of antireflection film

Example 9

| | | |
|---|---|---|
| Plastic lens substrate | Substrate B | |
| Hard coat layer | Layer B (A primer layer is present between the lens substrate and the layer B) | |
| Ion gun for pre-treatment | Accelerating voltage: 400 V, accelerating current: 170 mA | |
| Setting condition | 60 sec (treatment time) | |
| Gas used | Oxygen gas 10 sccm + Argon gas 10 sccm | |

| | Substance used, film thickness | Setting values of ion gun |
|---|---|---|
| First layer | Film thickness: 0.0534λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Second layer | $Nb_2O_5$: 0.0319λ<br>Refractive index: 2.21<br>CM2: Epolite 70P 5 sccm | Accelerating voltage: 450 V<br>Accelerating current: 180 mA<br>$O_2$: 20 sccm |
| Third layer | Film thickness: 0.561λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Fourth layer | $Nb_2O_5$: 0.1001λ<br>Refractive index: 2.21<br>CM2: Epolite 70P 5 sccm | Accelerating voltage: 450 V<br>Accelerating current: 180 mA<br>$O_2$: 20 sccm |
| Fifth layer | Film thickness: 0.0974λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |
| Sixth layer | $Nb_2O_5$: 0.1497λ<br>Refractive index: 2.21<br>CM2: Epolite 70P 20 sccm | Accelerating voltage: 450 V<br>Accelerating current: 180 mA<br>$O_2$: 20 sccm |
| Seventh layer | Film thickness: 0.2892λ<br>Refractive index: 1.468<br>M1: $SiO_2$<br>CM2: Epolite 70P 20 sccm | Accelerating voltage: 200 V<br>Accelerating current: 120 mA<br>$O_2$: 10 sccm<br>Ar: 10 sccm |

CM1 & CM2: Values set up by $N_2$-calibrated FMC

TABLE 1-10

Constitution of antireflection film

Example 10

| | |
|---|---|
| Plastic lens substrate | Substrate B |
| Hard coat layer | Layer B (A primer layer is present between the lens substrate and the layer B) |
| Ion gun for | Accelerating voltage: 400 V, accelerating current: 170 mA |

TABLE 1-10-continued

Constitution of antireflection film

| | | |
|---|---|---|
| pre-treatment | | |
| Setting condition | 60 sec (treatment time) | |
| Gas used | Oxygen gas 10 sccm + Argon gas 10 sccm | |

| | Substance used, film thickness | Setting values of ion gun |
|---|---|---|
| First layer | Film thickness: 0.0534λ<br>Refractive index: 1.471<br>M1: $SiO_2$ + $Al_2O_3$<br>CM2: Epolite 70P 20 sccm | Accelerating voltage: 200 V<br>Accelerating current: 120 mA<br>$O_2$: 10 sccm<br>Ar: 10 sccm |
| Second layer | $Nb_2O_5$: 0.0319λ<br>Refractive index: 2.21<br>CM2: Epolite 70P 5 sccm | Accelerating voltage: 450 V<br>Accelerating current: 180 mA<br>$O_2$: 20 sccm |
| Third layer | Film thickness: 0.575λ<br>Refractive index: 1.471<br>M1: $SiO_2$ + $Al_2O_3$<br>CM2: Epolite 70P 20 sccm | Accelerating voltage: 200 V<br>Accelerating current: 120 mA<br>$O_2$: 10 sccm<br>Ar: 10 sccm |
| Fourth layer | $Nb_2O_5$: 0.0908λ<br>Refractive index: 2.21<br>CM2: Epolite 70P 5 sccm | Accelerating voltage: 450 V<br>Accelerating current: 180 mA<br>$O_2$: 20 sccm |
| Fifth layer | Film thickness: 0.0952λ<br>Refractive index: 1.471<br>M1: $SiO_2$ + $Al_2O_3$<br>CM2: Epolite 70P 20 sccm | Accelerating voltage: 200 V<br>Accelerating current: 120 mA<br>$O_2$: 10 sccm<br>Ar: 10 sccm |
| Sixth layer | $Nb_2O_5$: 0.158λ<br>Refractive index: 2.21<br>CM2: Epolite 70P 5 sccm | Accelerating voltage: 450 V<br>Accelerating current: 180 mA<br>$O_2$: 20 sccm |
| Seventh layer | Film thickness: 0.2902λ<br>Refractive index: 1.471<br>M1: $SiO_2$ + $Al_2O_3$<br>CM2: Epolite 70P 20 sccm | Accelerating voltage: 200 V<br>Accelerating current: 120 mA<br>$O_2$: 10 sccm<br>Ar: 10 sccm |

CM1 & CM2: Values set up by $N_2$-calibrated FMC

TABLE 1-11

Comparative antireflection film

Comparative Example 1

| | |
|---|---|
| Plastic lens substrate | Substrate A |
| Hard coat layer | Layer A |
| Ion gun for pre-treatment | Accelerating voltage: 400 V, accelerating current: 170 mA |
| Setting condition | 60 sec (treatment time) |
| Gas used | Oxygen gas 10 sccm + Argon gas 10 sccm |

| | Substance used, film thickness | Setting values of ion gun |
|---|---|---|
| First layer | Film thickness: 0.438λ<br>Refractive index: 1.471<br>M1: $SiO_2$ | — |
| Second layer | $Nb_2O_5$: 0.0505λ | — |
| Third layer | Film thickness: 0.110λ<br>Refractive index: 1.471<br>M1: $SiO_2$ | — |
| Fourth layer | $Nb_2O_5$: 0.1357λ | — |
| Fifth layer | Film thickness: 0.0689λ<br>Refractive index: 1.471<br>M1: $SiO_2$ | — |
| Sixth layer | $Nb_2O_5$: 0.1357λ | — |
| Seventh layer | Film thickness: 0.271λ<br>Refractive index: 1.471<br>M1: $SiO_2$ | — |

TABLE 1-12

Comparative antireflection film

Comparative Example 2

| | |
|---|---|
| Plastic lens substrate | Substrate A |
| Hard coat layer | Layer A |
| Ion gun for pre-treatment | Accelerating voltage: 400 V, accelerating current: 170 mA |
| Setting condition | 60 sec (treatment time) |
| Gas used | Oxygen gas 10 sccm + Argon gas 10 sccm |

| | Substance used, film thickness | Setting values of ion gun |
|---|---|---|
| First layer | Film thickness: 0.511λ<br>Refractive index: 1.468<br>M1: $SiO_2$ | Accelerating voltage: 200 V<br>Accelerating current: 120 mA<br>$O_2$: 10 sccm<br>Ar: 10 sccm |
| Second layer | $Nb_2O_5$: 0.055λ | — |
| Third layer | Film thickness: 0.115λ<br>Refractive index: 1.468<br>M1: $SiO_2$ | Accelerating voltage: 200 V<br>Accelerating current: 120 mA<br>$O_2$: 10 sccm<br>Ar: 10 sccm |
| Fourth layer | $Nb_2O_5$: 0.1427λ | — |
| Fifth layer | Film thickness: 0.0740λ<br>Refractive index: 1.468<br>M1: $SiO_2$ | Accelerating voltage: 200 V<br>Accelerating current: 120 mA<br>$O_2$: 10 sccm<br>Ar: 10 sccm |
| Sixth layer | $Nb_2O_5$: 0.128λ | — |
| Seventh layer | Film thickness: 0.275λ<br>Refractive index: 1.468<br>M1: $SiO_2$ | Accelerating voltage: 200 V<br>Accelerating current: 120 mA<br>$O_2$: 10 sccm<br>Ar: 10 sccm |

TABLE 1-13

Comparative antireflection film

Comparative Example 3

| | |
|---|---|
| Plastic lens substrate | Substrate B |
| Hard coat layer | Layer B (A primer layer is present between the lens substrate and the layer B) |
| Ion gun for pre-treatment | Accelerating voltage: 400 V, accelerating current: 170 mA |
| Setting condition | 60 sec (treatment time) |
| Gas used | Oxygen gas 10 sccm + Argon gas 10 sccm |

| | Substance used, film thickness | Setting values of ion gun |
|---|---|---|
| First layer | Film thickness: 0.0539λ<br>Refractive index: 1.471<br>M1: $SiO_2$ | — |
| Second layer | $Nb_2O_5$: 0.0325λ | — |
| Third layer | Film thickness: 0.560λ<br>Refractive index: 1.471<br>M1: $SiO_2$ | — |
| Fourth layer | $Nb_2O_5$: 0.107λ | — |
| Fifth layer | Film thickness: 0.115λ<br>Refractive index: 1.471<br>M1: $SiO_2$ | — |
| Sixth layer | $Nb_2O_5$: 0.1394λ | — |
| Seventh layer | Film thickness: 0.289λ<br>Refractive index: 1.471<br>M1: $SiO_2$ | — |

TABLE 1-14

Comparative antireflection film

Comparative Example 4

| | |
|---|---|
| Plastic lens substrate | Substrate B |
| Hard coat layer | Layer B (A primer layer is present between the lens substrate and the layer B) |
| Ion gun for pre-treatment Setting condition | Accelerating voltage: 400 V, accelerating current: 170 mA 60 sec (treatment time) |
| Gas used | Oxygen gas 10 sccm + Argon gas 10 sccm |

| | Substance used, film thickness | Setting values of ion gun |
|---|---|---|

TABLE 1-14-continued

Comparative antireflection film

| | | |
|---|---|---|
| First layer | Film thickness: $0.0539\lambda$ Refractive index: 1.468 M1: $SiO_2$ | Accelerating voltage: 200 V Accelerating current: 120 mA $O_2$: 10 sccm Ar: 10 sccm |
| Second layer | $Nb_2O_5$: $0.0325\lambda$ | — |
| Third layer | Film thickness: $0.572\lambda$ Refractive index: 1.468 M1: $SiO_2$ | Accelerating voltage: 200 V Accelerating current: 120 mA $O_2$: 10 sccm Ar: 10 sccm |
| Fourth layer | $Nb_2O_5$: $0.1025\lambda$ | — |
| Fifth layer | Film thickness: $0.108\lambda$ Refractive index: 1.468 M1: $SiO_2$ | Accelerating voltage: 200 V Accelerating current: 120 mA $O_2$: 10 sccm Ar: 10 sccm |
| Sixth layer | $Nb_2O_5$: $0.1402\lambda$ | — |
| Seventh layer | Film thickness: $0.291\lambda$ Refractive index: 1.468 M1: $SiO_2$ | Accelerating voltage: 200 V Accelerating current: 120 mA $O_2$: 10 sccm Ar: 10 sccm |

TABLE 2

Evaluation of film performance

| Example[1] | LR[2] $Y_1$ % | LT[3] $Y_2$ % | Impact resistance | Adhesiveness | Abrasion resistance | Heat resistance | Alkali resistance | Bayer value |
|---|---|---|---|---|---|---|---|---|
| E-1 | 0.82% | 99.0% | CT = 2.0, FDA: O, 28 g at max. | 100/100 | UA | 95° C. | UA | 10.0 |
| E-2 | 0.82% | 99.0% | CT = 2.0, FDA: O, 28 g at max. | 100/100 | UA | 95° C. | UA | 10.0 |
| E-3 | 0.82% | 99.0% | CT = 2.0, FDA: O, 36 g at max. | 100/100 | UA | 95° C. | UA | 11.0 |
| E-4 | 0.82% | 99.0% | CT = 2.0, FDA: O, 368 g at max. | 100/100 | UA | 95° C. | UA | 11.0 |
| E-5 | 0.82% | 99.0% | CT = 1.0, FDA: O, 100 g at maximum | 100/100 | UA | 100° C. | UA | 12.0 |
| E-6 | 0.82% | 99.0% | CT = 1.0, FDA: O, 100 g at maximum | 100/100 | UA | 100° C. | UA | 12.0 |
| E-7 | 0.82% | 99.0% | CT = 2.0, FDA: O, 36 g | 100/100 | UA | 95° C. | UA | 12.5 |
| E-8 | 0.82% | 99.0% | CT = 2.0, FDA: O, 36 g | 100/100 | UA | 95° C. | UA | 12.5 |
| E-9 | 0.82% | 99.0% | CT = 1.0, FDA: O, 100 g | 100/100 | UA | 105° C. | UA | 12.0 |
| E-10 | 0.82% | 99.0% | CT = 1.0, FDA: O, 100 g | 100/100 | UA | 105° C. | UA | 12.0 |
| CE-1 | 1.0% | 98.8% | CT = 2.0, FDA: X | 100/100 | UA | 70° C. | UA | 3.0 |
| CE-2 | 0.82% | 99.0% | CT = 2.0, FDA: X | 100/100 | UA | 80° C. | UA | 5.5 |
| CE-3 | 1.0% | 98.8% | CT = 1.0, FDA: O, 100 g | 100/100 | UA | 80° C. | UA | 2.7 |
| CE-4 | 1.0% | 98.8% | CT = 1.0, FDA: O, 100 g | 100/100 | UA to A | 85° C. | UA | 3.5 |

Notes in Table 2:
[1]E = Example, CE = Comparative Example
[2]LR = luminous reflectance
[3]LM = Luminous transmittance

The results of Examples 1-4, 7 and 8 are to be compared with those of Comparative Examples 1 and 2, and the results of Examples 5, 6, 9 and 10 are to be compared with those of Comparative Examples 3 and 4. In comparison with the results of Comparative Examples 1 and 2, those of Examples 1-4, 7 and 8 reveal that the impact resistance was good. Also, in comparison with the results of Comparative Examples 3 and 4, those of Examples 5, 6, 9 and 10 reveal that the Bayer value was good.

The optical member of the invention not only has an antireflection film having excellent properties such as low reflectance and high transmittance but also has excellent impact resistance, adhesiveness, heat resistance, abrasion resistance and alkali resistance on the plastic substrate and is good in productivity.

While the invention has been described in connection with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. Optical member comprising a plastic substrate and a multilayered antireflection film formed by vapor deposition, wherein at least one layer in the antireflection film is a hybrid layer formed of the following materials as vapor deposition raw materials:
   (i) at least one inorganic substance selected from silicon dioxide, aluminum oxide, titanium oxide, zirconium oxide, tantalum oxide, yttrium oxide, and niobium oxide, and
   (ii) at least one organic compound not containing silicon which is a liquid at normal temperature and at atmospheric pressure, selected from any of the general formulae (e)-(g):

wherein
$R^9$ is a $C_{1-10}$-hydrocarbon group or trimethylolpropane wherein the compound of general formula (f) is selected from the group consisting of neopentyl glycol diglycidyl ether, glycerol diglycidyl ether, propylene glycol diglycidyl ether, tripropylene glycol diglycidyl ether, polypropylene glycol diglycidyl ether, 1,6-hexanediol diglycidyl ether;
and wherein the compound of general formula (g) is selected from the group consisting of vinylpyrrolidone, vinylcarbazole, methyl methacrylate, ethyl methacrylate, benzyl methacrylate, n-butyl methacrylate, isobutyl methacrylate, dimethylaminoethyl methacrylate, methacrylic acid, glycidyl methacrylate, vinyl acetate, and styrene.

2. Optical member of claim 1, wherein the hybrid layer is formed by simultaneously vapor depositing the materials (i) and (ii) with separate vapor deposition sources.

3. Optical member of claim 2, wherein the material (i) is vaporized by heating using an electron gun, and the material (ii) is stored in a tank and is vaporized by heating within the tank.

4. Optical member of any of claims 1-3, wherein the hybrid layer is formed by ion beam assisted deposition.

5. Optical member of any of claims 1-3, wherein the material (ii) is vapor deposited by heating without adding a solvent.

6. Optical member of any of claims 1-3, wherein the content of the material (ii) in the hybrid layer is 0.02-25 wt.-%.

7. Optical member of any of claims 1-3, wherein an undercoat layer made of at least one member selected from Ni, Ag, Pt, Nb and Ti and having a thickness of 1-5 nm is provided between the plastic substrate and the antireflection film.

8. Optical member of any of claims 1-3, wherein the plastic substrate comprises diethylene glycol bisallyl carbonate as a raw material.

9. Optical member of any of claims 1-3, wherein between the plastic substrate and the antireflection film a primer layer and a cured layer are provided in this order from the plastic substrate.

10. Optical member of any of claims 1-3, wherein an organosilicon compound which consists of carbon, silicon and atoms selected from hydrogen, oxygen and nitrogen is employed as a vapor deposition material in combination with the material (ii).

11. Optical member of any of claims 1-3, wherein the organic compound not containing silicon (ii) has a number average molecular weight of 28-320.

12. Optical member of claim 1, wherein the compound (ii)-(e) is a compound selected from the group consisting of methyl glycidyl ether, butyl glycidyl ether, 2-ethylhexyl glycidyl ether, decyl glycidyl ether, stearyl glycidyl ether, allyl glycidyl ether, phenyl glycidyl ether, p-sec-butylphenyl glycidyl ether, p-tert-butylphenyl glycidyl ether, 2-methyloctyl glycidyl ether, glycidol, and trimethyloipropane polyglycidyl ether.

* * * * *